(12) United States Patent
Linderborg et al.

(10) Patent No.: US 6,834,193 B1
(45) Date of Patent: Dec. 21, 2004

(54) METHOD FOR PROCESSING A TRAFFIC CHANNEL REQUEST

(75) Inventors: Jussi Linderborg, Helsinki (FI); Risto Aalto, Riihimäki (FI); Timo Halonen, Helsinki (FI); Jarkko Reijonaho, Vantaa (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/601,767

(22) PCT Filed: Feb. 1, 1999

(86) PCT No.: PCT/FI99/00067

§ 371 (c)(1),
(2), (4) Date: Aug. 29, 2000

(87) PCT Pub. No.: WO99/39535

PCT Pub. Date: Aug. 5, 1999

(30) Foreign Application Priority Data

Feb. 2, 1998 (FI) ................................................ 980229

(51) Int. Cl.⁷ ................................................ H04Q 7/20
(52) U.S. Cl. ................. 455/450; 455/452.1; 455/452.2; 455/453; 370/329; 370/431; 370/437
(58) Field of Search .............................. 455/62, 67.13, 455/422.1, 446, 450, 452.1, 452.2, 453, 509; 370/329, 431, 437

(56) References Cited

U.S. PATENT DOCUMENTS

| | | | |
|---|---|---|---|
| 4,670,899 A | | 6/1987 | Brody et al. |
| 5,455,821 A | | 10/1995 | Schaeffer et al. |
| 5,475,868 A | * | 12/1995 | Duque-Anton et al. ....... 455/62 |
| 5,497,504 A | | 3/1996 | Acampora et al. |
| 5,542,093 A | | 7/1996 | Bodin et al. |
| 5,551,064 A | * | 8/1996 | Nobbe et al. .................. 455/62 |
| 5,678,178 A | * | 10/1997 | Tahkokorpi .............. 455/452.1 |
| 5,873,047 A | * | 2/1999 | Nakano et al. ............. 455/561 |
| 5,907,543 A | * | 5/1999 | Jeon et al. .................... 370/335 |
| 6,009,331 A | * | 12/1999 | Ueda ........................... 455/450 |
| 6,023,622 A | * | 2/2000 | Plaschke et al. ......... 455/452.2 |
| 6,047,189 A | * | 4/2000 | Yun et al. ................ 455/452.2 |
| 6,088,335 A | * | 7/2000 | I et al. ........................ 370/252 |
| 6,128,473 A | * | 10/2000 | Ritzen et al. .............. 455/63.3 |
| 6,163,547 A | * | 12/2000 | De Vriendt et al. ........ 370/466 |
| 6,212,380 B1 | * | 4/2001 | Laatu ........................... 455/436 |
| 6,223,041 B1 | * | 4/2001 | Egner et al. ............. 455/452.2 |
| 6,246,878 B1 | * | 6/2001 | Wallentin .................... 455/442 |

FOREIGN PATENT DOCUMENTS

| | | |
|---|---|---|
| EP | 0 585 994 | 3/1994 |
| EP | 0 767 548 | 4/1997 |
| WO | WO 97/13334 | 4/1997 |

* cited by examiner

Primary Examiner—William Trost
Assistant Examiner—James D Ewart
(74) Attorney, Agent, or Firm—Pillsbury Winthrop LLP

(57) ABSTRACT

The invention relates to a method for processing a traffic channel request in a cellular radio system. To ensure that the allocation of a new traffic channel would not disturb adjacent cells, the method comprises the steps of: calculating the number of traffic channels in use in a radio cell; measuring the quality of ongoing connections of adjacent cells using at least to some extent the same frequency channels as said radio cell; and preventing the traffic channel from being allocated to a mobile station from said radio cell if the number of traffic channels in use exceeds a predetermined threshold value and if in any of said adjacent cells the mean value of quality for ongoing connections is lower than a predetermined minimum quality value.

6 Claims, 2 Drawing Sheets

METHOD FOR PROCESSING A TRAFFIC CHANNEL REQUEST

The invention relates to a method for processing a traffic channel request in a cellular radio system in which a request is received for the allocation of a traffic channel to a mobile station from a particular radio cell. The invention further relates to a cellular radio system comprising at least a first and a second base station located close to each other and having traffic channels that utilize at least to some extent the same frequency channels, and allocation means for allocating a traffic channel to a mobile station from the first base station in response to a traffic channel request. The invention also relates to a base station controller comprising means for controlling base stations and allocation means for allocating a traffic channel to a mobile station from a particular radio cell in response to a traffic channel request received by the base station controller.

The invention relates to the allocation of a traffic channel to a mobile station of a cellular radio system in which a plurality of base stations utilize the same frequency channels in their traffic connections. In these systems, base stations using the same frequency channels may occasionally disturb each other, which degrades the quality of the connections transmitted through the base stations.

In known mobile communication systems the allocation of a traffic channel to a particular mobile station usually depends on whether or not there is a traffic channel available in a radio cell at a particular moment. In other words, if the radio cell concerned has a traffic channel available, it is allocated to a mobile station when needed. In the GSM system (Global System for Mobile Communications), for example, traffic channels are allocated as described above. Since the GSM system is time-divisional, a traffic channel to be allocated to a mobile station in the system consists of a time slot on a particular frequency channel. Alternatively, if frequency hopping is used, the frequency channel of the traffic channel changes from one time slot to another according to a predetermined frequency hopping sequence. The mobile station thus transmits alternately on all frequency channels included in the frequency hopping sequence.

A problem with the allocation of traffic channels in known mobile systems is that when a traffic channel is being allocated in a particular radio cell, the situation prevailing in adjacent cells in not taken into account in any way. Yet in practice the allocation of new traffic channels always affects to some extent at least the situation in the adjacent cells that utilize at least to some extent the same frequency channels.

An object of the present invention is to solve the above mentioned problem and to provide a method for allocating traffic channels which allows the quality of the traffic connections provided by the system to be maintained as high as possible. This is achieved with a method of the invention in which a request is received for the allocation of a traffic channel to a mobile station, the method being characterized in that the method comprises the steps of: calculating the number of traffic channels in use in said radio cell; measuring the quality of ongoing connections of adjacent radio cells using at least to some extent the same frequency channels as said radio cell; and deciding whether a traffic channel is to be allocated or not allocated, the number of traffic channels in use and the quality of the ongoing connections of the adjacent cells being at least taken into account in the decision so that the allocation of the traffic channel to the mobile station from said radio cell is prevented if the number of traffic channels in use exceeds a predetermined threshold value and if the mean value of quality for the ongoing connections of any of the adjacent cells is lower than a predetermined minimum quality value.

The invention is based on the idea that when a decision regarding the allocation of a traffic channel is made, also the situation prevailing in adjacent cells that employ, at least to some extent, the same frequency channels as the cell in which the new traffic channel is to be allocated is taken into account, thereby avoiding a situation where interference caused in the cells by the allocation of the new traffic channel rises to a level that degrades the quality of ongoing connections. In other words, even if the radio cell the received traffic channel request concerns would have a traffic channel available, the traffic channel is not automatically allocated to the mobile station. Instead, a mean value of quality is calculated for each adjacent cell, the value providing a mean value for the cell's ongoing connections. If the mean value of quality for any of the cells is then discovered to be lower than a predetermined minimum quality value, or if the mean value of quality for the cells concerned can be assumed to decrease distinctly if a new traffic channel is allocated, the new traffic channel is not allocated. In this context 'adjacent cell' refers to a cell which is located so close to a cell in which a traffic channel is to be allocated that the new traffic channel can be assumed to affect the ongoing connections of the adjacent cell. The adjacent cell therefore need not be necessarily located next to the cell in which the traffic channel is to be allocated, but there can be another radio cell or several cells between the cells concerned.

In a preferred embodiment of the method of the invention the mobile station to which a channel is to be allocated is checked to find out whether the mobile station already has a traffic channel in use. This is taken into account when the decision concerning the allocation of the traffic channel is made; if the mobile station has a traffic channel in use and it abandons the channel in connection with the allocation of the new channel without thereby increasing interference in the system, the new traffic channel can be allocated to the mobile station (provided that a traffic channel is available), without taking into account the quality of the ongoing connections of the adjacent cells.

The invention further relates to a cellular radio system in which the method of the invention can be utilized. The cellular radio system of the invention is characterized in that the cellular radio system further comprises: means for finding out the number of traffic channels in use at the first base station; means for finding out a mean value of quality for ongoing traffic connections of said at least second base station; and comparison means for comparing the number of the traffic channels with a predetermined maximum number and for comparing the mean value of quality with a predetermined minimum quality value; and that said allocation means are responsive to the comparison means for preventing the allocation of the traffic channel if the number of traffic channels in use exceeds the maximum number and the mean value of quality is lower than the minimum value.

When a traffic channel request concerning the first base station, for example, is received in the cellular radio system of the invention, information is obtained about the traffic situation of the base station concerned and also the situation of the base stations located in the vicinity and using the same frequency channels. The base stations to be taken into account are preferably designated in advance, for example, a base station controller of the system can have a list stored in the memory comprising the base stations the situation of which is to be taken into account when a traffic channel is to be allocated at a particular base station. In other words, the operator has stored data on base stations for which the new traffic channel to be allocated may be significant in advance into the memory. The allocation of the traffic channel thus comprises the checking of the mean values of quality for the ongoing connections of the base stations in question. If the mean value of quality for even one base station is below the minimum quality level determined by the operator, a new traffic channel is not allocated. This ensures a high quality of the connections provided.

The invention also relates to a base station controller which can be utilized in a radio system of the invention and which is characterized in that the base station controller comprises: means for finding out the number of traffic channels in use in said radio cell; memory means into which are stored data needed for identifying adjacent cells of said radio cell; means for finding out the mean values of quality for the ongoing traffic connections of the adjacent cells; and comparison means for comparing the number of the traffic channels with a predetermined maximum number and for comparing the means values of quality with a predetermined minimum quality value; and that said allocation means are responsive to the comparison means for preventing the allocation of a traffic channel if the number of traffic channels in use exceeds the maximum number and the mean value of quality for at least one adjacent cell is lower than the minimum quality value.

The preferred embodiments of the method, cellular radio system and base station controller of the invention are disclosed in the accompanying dependent claims 2 to 4, 6.

In the following the invention will be described in greater detail with reference to the accompanying drawings, in which FIG. 1 is a flow diagram illustrating a first preferred embodiment of a method of the invention;

In block A is received a request for the allocation of a traffic channel to a mobile station in a particular radio cell, for example in a radio cell C1.

In block B is checked whether a traffic channel is already allocated to the mobile station concerned from the cell C1 in question, in which case an intra-cell handover would be concerned. Since the allocation of the channel would not increase the number of traffic channels in use or the interference between cells located close to each other, in such a situation a traffic channel could be directly allocated in block C (provided that one is available).

Figure 1:
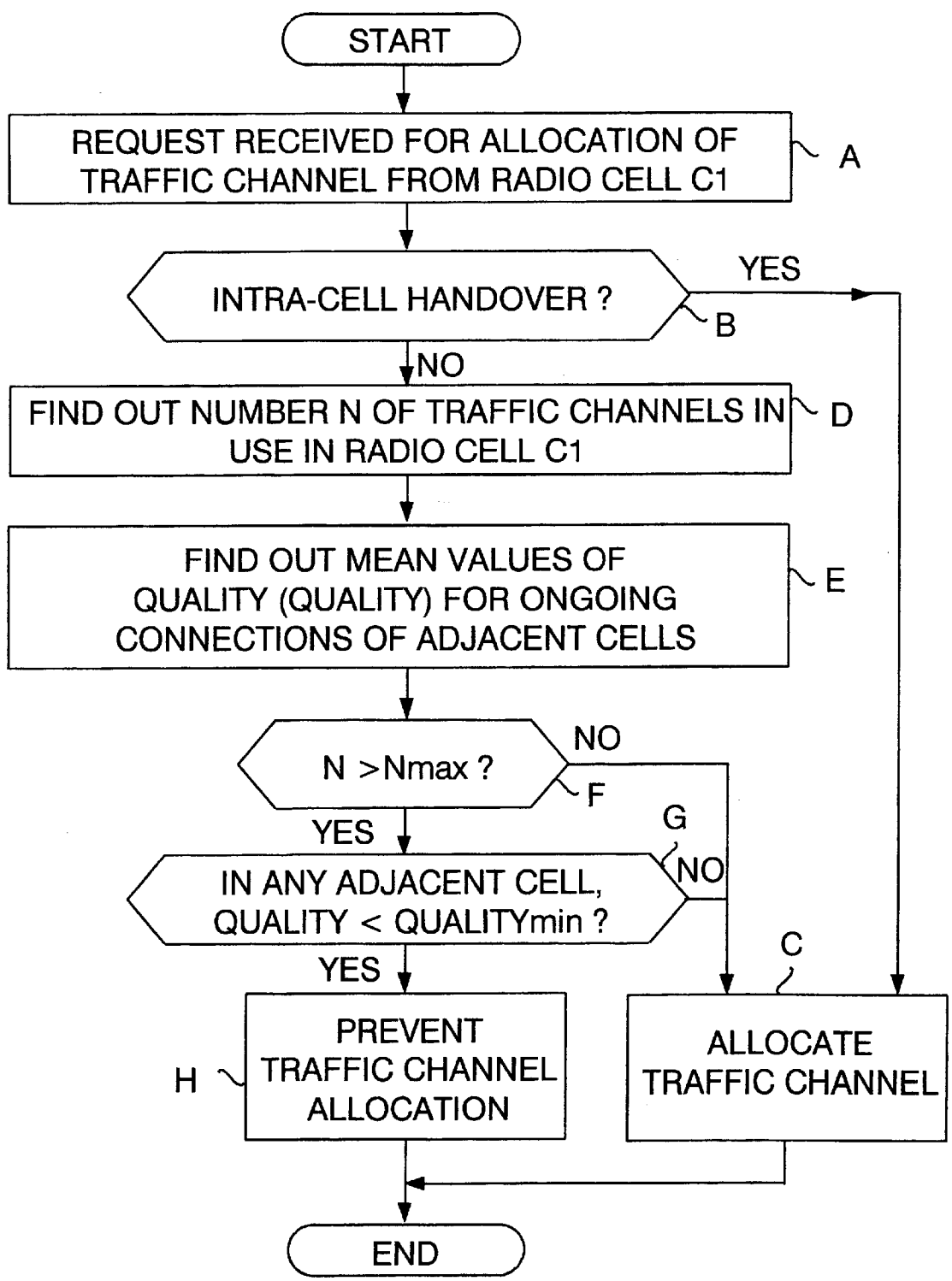
FIG. 1 is a flow diagram illustrating a first preferred embodiment of a method of the invention. The flow diagram of FIG. 1 can be utilized for example at a base station controller of a GSM system for making a decision regarding the allocation of a traffic channel.

As distinct from FIG. 1, in block B could be additionally checked whether a traffic channel has been allocated to the mobile station in question from an adjacent cell of the cell C1, such as a cell C2, through which the mobile station already uses the frequency channels that the new traffic channel to be allocated in the radio cell C1 would also use. Also in this case the traffic channel could be directly allocated to the mobile station because the interference between cells located close to each other would not increase due to the mobile station being provided with a new traffic channel and abandoning an old one.

If in the case of FIG. 1, the routine observes at block B that an intra-cell handover is not involved, the routine proceeds to block D to calculate a number N of the traffic channels in use in the radio cell C1.

In block E the mean values of quality QUALITY for the ongoing connections of the adjacent cells of the cell C1 are determined (by computing average bit error ratios separately for each adjacent cell, for example). The adjacent cells thus consist of cells using at least one of the frequency channels that the new traffic channel to be allocated in the cell C1 would use, the frequency channels being located at such a distance from the radio cell C1 that the traffic channel to be allocated in the cell C1 might disturb them. In practice the operator can determine the adjacent cells of the cell C1 in advance by applying field strength measurements, for example.

In the GSM system, for example, values for the quality of the connections can be determined in such a way that mobile stations and base stations serving the radio cells report the quality of the connections they provide at intervals of 0.48 seconds. The data provided during the last ten seconds, for example, can then be used to calculate a mean value of quality QUALITY for each radio cell.

In block F is checked whether the number N of traffic channels in use in the radio cell C1 exceeds the threshold value Nmax determined by the operator. The threshold value Nmax does not represent the largest possible number of traffic channels available in the cell, but the number of traffic channels in use on the basis of which the operator considers the traffic in the cell to be heavy. If this is the case, i.e. the traffic is heavy, the routine proceeds to block G where the mean values of quality QUALITY for the connections of the adjacent cells are compared with the minimum quality value QUALITYmin determined by the operator.

If the comparisons made in the above blocks F and G show that the threshold value Nmax is exceeded and that the mean value of quality QUALITY for at least one base station is lower than the minimum quality value QUALITYmin, then the traffic connections of the radio cells already interfere with each other too much and the routine therefore proceeds to block H where the allocation of the traffic channel is prevented. Otherwise the routine proceeds to block C where a traffic channel from the radio cell C1 is allocated to the mobile station.

Figure 2:
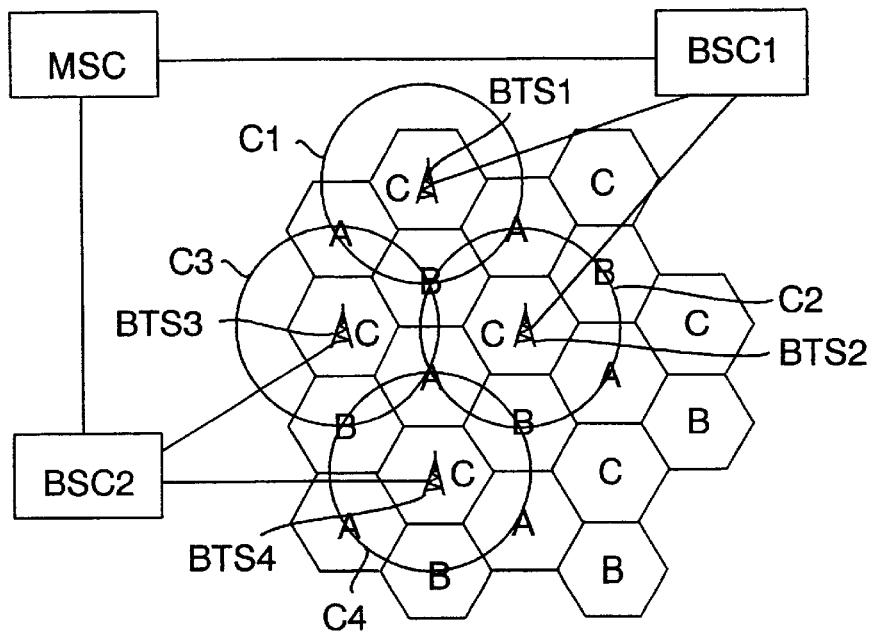
FIG. 2 is a block diagram illustrating a first preferred embodiment of a cellular radio system of the invention.
Figure 3:
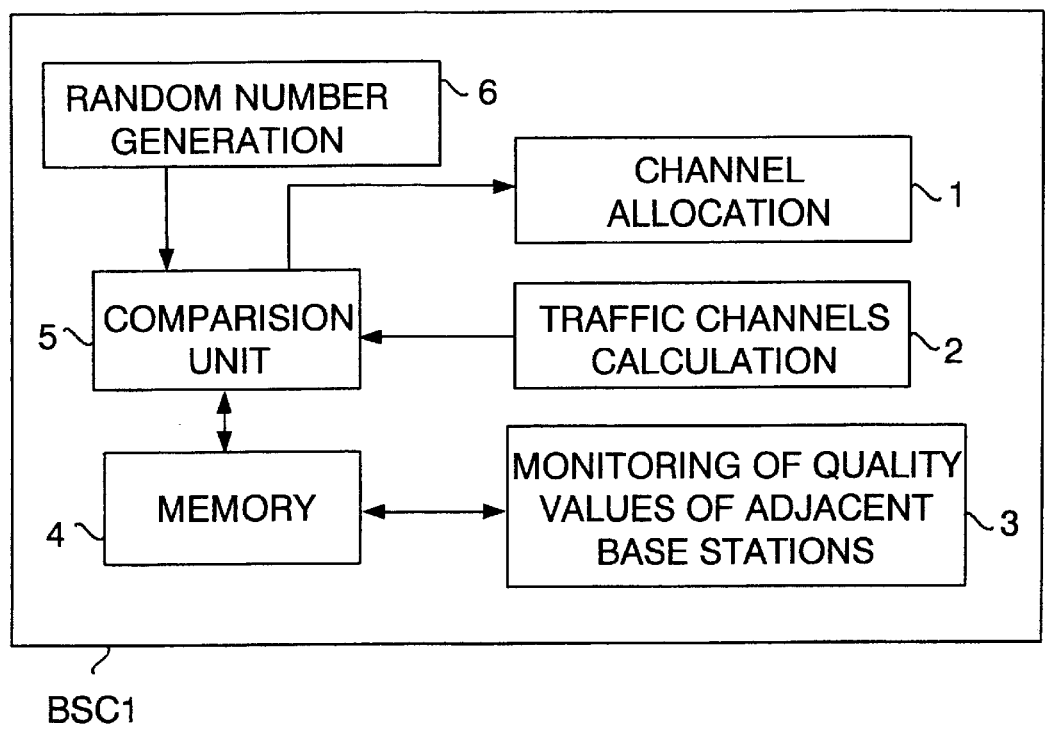
FIG. 3 is a block diagram of a base station controller BSC1 of FIG. 2.

FIG. 2 is a block diagram illustrating a first preferred embodiment of the cellular radio system of the invention, and FIG. 3 is a block diagram illustrating a base station controller BSC1 of FIG. 2. The cellular radio system shown in FIGS. 2 and 3 is assumed to be, by way of example, a GSM system employing frequency hopping.

FIG. 2 illustrates the re-use of frequency channels: the radio cells sharing one or more frequency channels in their traffic connections are denoted with like references A, B or C. In FIG. 2 the re-use of frequencies is shown by way of example; in practice the re-use of frequencies can deviate from that shown in FIG. 2.

In FIG. 2 the areas where the base stations of the cells C1 to C4 cause interference are illustrated with circles. As can be seen in the Figure, the cells C1 to C4 interfere with each other at least in the sections of the circles. At least in these areas there is interference that degrades the quality of ongoing connections.

The base station controller BSC1 comprises a calculation unit 2 which calculates at predetermined intervals the number N of traffic channels in use in the cell C1. The base station controller BSC1 further comprises a quality values monitoring unit 3, the unit monitoring at predetermined intervals the mean value of quality QUALITY for ongoing traffic connections of each adjacent cell of the radio cell C1.

The adjacent cells monitored by the quality values monitoring unit 3 are determined on the basis of the data stored in advance into a memory 4 by the operator. In FIGS. 2 and 3 it is assumed that the cells determined in the memory 4 as adjacent cells of the cell C1 are cells C2 and C3, i.e. cells using frequency channels corresponding to those of the cell C1 and located so close to the cell C1 that interference may occur.

Since a base station BTS3 serving the adjacent cell C3 is controlled by the second base station controller BSC2, the base station controller BSC1 of FIGS. 2 and 3 uses the data transmission connection provided via the mobile switching centre MSC to send the base station controller BSC2 a message in which it commands the base station controller BSC2 to send to it the mean value of quality QUALITY for the traffic channels used by the cell C3. It can send this message in connection with the reception of the traffic channel request. Alternatively, the base station controller BSC2 can be arranged to continuously send the mean values of quality QUALITY for the ongoing connections of the cell C3 to the base station controller BSC1.

The quality values monitoring unit 3 in the base station controller BSC1 stores the mean values of quality for the connections of the cells C2 and C3 into the memory 4 so that for each adjacent base station, the mean value of quality measured during the last ten seconds can always be found in the memory.

When the base station controller BSC1 receives a traffic channel request for the allocation of a new traffic channel in the radio cell C1, i.e. a cell served by the base station BTS1, the traffic channel calculation unit 2 supplies to the comparison unit 5 the number N of the traffic channels in use in the cell C1. The mean values of quality QUALITY for the traffic channels of adjacent base stations are retrieved from the memory 4 by the comparison unit 5. The comparison unit 5 first retrieves from the memory the minimum quality value QUALITYmin, the maximum quality value QUALITYmax and the maximum number Nmax of traffic channels in the cell C1, stored in advance into the memory 4 by the operator. On the basis of the above information the comparison unit 5 informs a channel allocation unit 1 either that it is to allocate a channel or that it is not to allocate a channel, the decision being based on the following:

if N≦Nmax, a channel is allocated;
if N>Nmax, and the mean value of quality QUALITY for even one adjacent cell is lower than the minimum quality value QUALITYmin, a channel is not allocated; and
if N>Nmax, and the mean values of quality QUALITY for all adjacent cells are higher than the maximum quality value QUALITYmax, a channel is allocated.

In addition to the above mentioned reference values Nmax, QUALITYmin and QUALITYmax, the operator has stored into the memory 4 a plural number of threshold values for mean values of quality, and probabilities corresponding to these. Therefore, if N>Nmax and the mean values of quality QUALITY for all adjacent cells are higher than the minimum quality value QUALITYmin, but the mean value of quality QUALITY for even one adjacent cell is lower than the maximum quality value QUALITYmax, the comparison unit 5 makes the decision on the allocation of a channel on the basis of random numbers. All channel requests are therefore not automatically accepted but some are rejected. The lower the quality of the traffic connections of the adjacent cells, the more probable is the rejection. The following table, for example, is stored in the memory:

| Mean value of quality | Probability |
|---|---|
| QUALITY<QUALITYmin | 0 |
| QUALITYmin<QUALITY≦QUALITY1 | 0.2 |
| QUALITY1<QUALITY≦QUALITY2 | 0.4 |
| QUALITY2<QUALITY≦QUALITY3 | 0.6 |
| QUALITY3<QUALITY≦QUALITYmax | 0.8 |
| QUALITYmax<QUALITY | 1 |

In this case the comparison unit multiplies the probabilities provided by the above table with each other. A probability is obtained for each base station on the basis of the mean value of quality of its ongoing connections. The comparison unit compares the number obtained as a result of the multiplication to a random number from 0.00 to 1.00 generated by a random number generator 6. If the random number is smaller than the number obtained by multiplying the probabilities, a traffic channel is allocated—otherwise it is not.

Let us assume that the mean value of quality QUALITY for the ongoing connections of the cell C2 falls between QUALITYmin<QUALITY≦QUALITY1, providing the probability 0.2. The mean value of quality QUALITY for simultaneously ongoing connections of the cell C3 falls between QUALITY3<QUALITY≦QUALITYmax., providing the probability 0.8. By multiplying the probabilities the following result is obtained: 0.2*0.8=0.16. If the random number generator then generates a random number 0.10, for example, a traffic channel is allocated (whereas with a random number 0.44, for example, the channel is not allocated).

As distinct from the above description, a base station controller can also be implemented without a random number generator. Instead of a random number generated by a random number generator, a predetermined fixed reference number is then used, the comparison unit 5 comparing the number calculated from the probabilities with the reference number.

It is to be understood that the above description and the related drawings are only intended to illustrate the present invention. The invention can thus be also utilized in other cellular radio systems than in the GSM system shown by way of example. It will be apparent to those skilled in the art that many variations and modifications can be made to the invention without departing from the scope and spirit of the invention disclosed in the attached claims.

What is claimed is:

1. A method for processing a traffic channel request in a cellular radio system in which a request is received for the allocation of a traffic channel to a mobile station from a particular radio cell, the method comprising:

calculating the number of traffic channels in use in said radio cell:

measuring the quality of ongoing connections of adjacent radio cells using at least to some extent the same frequency channels as said radio cell;

deciding whether a traffic channel is to be allocated or not allocated, the number of traffic channels in use and the quality of the ongoing connections of the adjacent cells being at least taken into account in the decision so that the allocation of the traffic channel to the mobile station from said radio cell is prevented if the number of traffic channels in use exceeds a predetermined threshold value and if the mean value of quality for the ongoing connections of any of the adjacent cells is lower than a predetermined minimum quality value;

determining probabilities corresponding to different mean values of quality;

calculating mean values for the ongoing connections of said adjacent cells;

calculating a number by utilizing the probabilities corresponding to said mean values; and comparing said number with a number generated by a random number generator, wherein said comparing said number with a number generated by a random number generator is further taken into account when the decision regarding the allocation or non-allocation of the traffic channel is made so that if the mean values of quality for all adjacent cells are higher than said minimum quality value and lower than a predetermined maximum quality value the traffic channel is allocated, provided that the number generated by the random number generator is smaller than or equal to the number calculated by using the probabilities.

2. A method according to claim 1, further comprising checking whether the mobile station concerned already has a traffic channel in use in any of said cells, wherein in said decision regarding the allocation or non-allocation of a traffic channel, the result of the check is also taken into account and, if the mobile station already has a traffic channel in use in any of said cells, a new traffic channel is allocated to the mobile station, irrespective of the mean values of quality for the ongoing connections of the adjacent cells.

3. A method for processing a traffic channel request in a cellular radio system in which a request is received for the allocation of a traffic channel to a mobile station from a particular radio cell, the method comprising:

calculating the number of traffic channels in use in said radio cell;

measuring the quality of ongoing connections of adjacent radio cells using at least to some extent the same frequency channels as said radio cell;

deciding whether a traffic channel is to be allocated or not allocated, the number of traffic channels in use and the quality of the ongoing connections of the adjacent cells being at least taken into account in the decision so that the allocation of the traffic channel to the mobile station from said radio cell is prevented if the number of traffic channels in use exceeds a predetermined threshold value and if the mean value of quality for the ongoing connections of any of the adjacent cells is lower than a predetermined minimum quality value;

determining probabilities corresponding to different mean values of quality;

calculating mean values for the ongoing connections of said adjacent cells;

calculating a number by utilizing probabilities corresponding to said mean values; and comparing said calculated number with a predetermined reference number, wherein said comparing said calculated number with a predetermined reference number is further taken into account when the decision regarding the allocation or non-allocation of the traffic channel is made so that if the mean values of quality for all adjacent cells are higher than said minimum quality value and lower than a predetermined maximum quality value the traffic channel is allocated, provided that said predetermined reference number is smaller than or equal to the number calculated by using the probabilities.

4. A method according to claim 3, further comprising checking whether the mobile station concerned already has a traffic channel in use in any of said cells, and wherein in said decision regarding the allocation or non-allocation of a traffic channel the result of the check is also taken into account and, if the mobile station already has a traffic channel in use in any of said cells, a new traffic channel is allocated to the mobile station, irrespective of the mean values of quality for the ongoing connections of the adjacent cells.

5. A cellular radio system comprising:

at least a first and a second base station located close to each other and having traffic channels that utilize at least to some extent the same frequency channels;

an allocation unit configured to allocate a traffic channel to a mobile station from the first base station in response to a traffic channel request;

a monitoring unit configured to find out the number of traffic channels in use at the first base station;

said monitoring unit being configured to out mean values of quality for ongoing connections of a plurality of base stations located close to the first base station; and a comparison unit configured to compare the number of the traffic channels with a predetermined maximum number and to compare the mean values of quality with a predetermined minimum quality value, wherein said allocation unit is responsive to the comparison unit to prevent the allocation of the traffic channel if the number of traffic channels in use exceeds the maximum number and a mean value of quality is lower than the minimum quality value, and when the mean values of quality for all said base stations are higher than said minimum quality value the comparison unit is arranged to compare the mean values of quality with a predetermined maximum quality value, and when the mean values of quality are lower than the maximum quality value the comparison unit is arranged to use probabilities corresponding to the mean values of quality for calculating a number and to compare the number with a number generated by a random number generator and to control the allocation unit to allocate a traffic channel if the number generated by the random number generator is smaller than or equal to the number calculated by using the probabilities.

6. A cellular radio system according to claim 5 wherein said cellular radio system is a digital cellular radio system.

* * * * *